(12) United States Patent
Qi et al.

(10) Patent No.: US 12,511,465 B2
(45) Date of Patent: Dec. 30, 2025

(54) DEFECT DIAGNOSIS WITH DYNAMIC ROOT CAUSE DETECTION

(71) Applicant: Siemens Industry Software Inc., Plano, TX (US)

(72) Inventors: Xiaoyuan Qi, Portland, OR (US); Fan Jiang, Beaverton, OR (US); Gaurav Veda, Hillsboro, OR (US); Manish Sharma, Wilsonville, OR (US); Wu-Tung Cheng, Lake Oswego, OR (US)

(73) Assignee: Siemens Industry Software Inc., Plano, TX (US)

( * ) Notice: Subject to any disclaimer, the term of this patent is extended or adjusted under 35 U.S.C. 154(b) by 684 days.

(21) Appl. No.: 17/823,273

(22) Filed: Aug. 30, 2022

(65) Prior Publication Data
US 2024/0070371 A1 Feb. 29, 2024

(51) Int. Cl.
*G06F 30/398* (2020.01)
*G01R 31/28* (2006.01)
*G06F 30/392* (2020.01)

(52) U.S. Cl.
CPC ....... *G06F 30/398* (2020.01); *G01R 31/2851* (2013.01); *G06F 30/392* (2020.01)

(58) Field of Classification Search
CPC ...... G06F 30/398; G06F 30/20; G06F 30/392; G06F 30/39; G06F 30/30; G06F 11/3006; G06F 40/137; G06F 30/33; G06F 30/3308; G06F 30/367; G06F 30/27; G06F 3/0608; G06F 30/327; G06F 30/333; G03F 1/36; G03F 7/7065; G03F 7/70658; G03F 1/70; G03F 7/70433; H01L 21/67161; H01L 21/67225
USPC .................................. 716/108–115
See application file for complete search history.

(56) References Cited

U.S. PATENT DOCUMENTS

| | | | |
|---|---|---|---|
| 8,509,517 B2 * | 8/2013 | Blanton | G06T 7/001 382/190 |
| 8,930,782 B2 | 1/2015 | Benware | |
| 2008/0301597 A1 * | 12/2008 | Chen | G01R 31/2894 716/136 |
| 2020/0133959 A1 * | 4/2020 | Chen | H01L 22/20 |
| 2022/0335187 A1 * | 10/2022 | Wohl | G01R 31/318342 |

* cited by examiner

*Primary Examiner* — Binh C Tat (57) ABSTRACT

This application discloses a computing system to identify suspected defects in a manufactured integrated circuit, which correspond to electrical failures detected by a test applied to the manufactured integrated circuit. The computing system can utilize the suspected defects in the manufactured integrated circuit to cluster features in a physical layout design describing the manufactured integrated circuit. Each cluster of the features corresponds to a candidate for a physical root cause of the suspected defects in the manufactured integrated circuit. The computing system can detect a physical root cause of the electrical failures in the manufactured integrated circuit based on the clusters of the features. A physical failure analysis process includes an inspection of the manufactured integrated circuit to confirm the physical root cause of the electrical failures in the manufactured integrated circuit corresponds to a systemic manufacturing fault in the manufactured integrated circuit.

17 Claims, 6 Drawing Sheets

DEFECT DIAGNOSIS WITH DYNAMIC ROOT CAUSE DETECTION

TECHNICAL FIELD

This application is generally related to electronic design automation and, more specifically, to defect diagnosis with dynamic root cause detection.

BACKGROUND

Since defects in integrated circuits can be introduced during manufacturing, manufacturers often test integrated circuit chips to identify faults and diagnose defects in the integrated circuit chips. Integrated circuit testing typically includes applying a set of test stimuli or test patterns to a circuit-under-test and then analyzing responses generated by the circuit-under-test. To make it easier to develop and apply test patterns, certain testability features can be added to integrated circuit designs, referred to as design for test or design for testability (DFT). In a design for test scheme, called scan chain testing, sequential state elements in integrated circuit designs, for example, latches, flip-flops, or the like, can be made controllable and observable via a serial interface. For example, the sequential state elements can be replaced with dual-purpose state elements, called scan cells, which can be connected together to form scan chains acting as serial shift registers for shifting in test patterns and shifting out test responses.

Automatic Test Equipment (ATE) can load test patterns to scan chains in a circuit-under-test and unload test responses from the scan chain in the circuit-under-test. Some defect diagnosis tools can implement processes that utilize the test patterns and test responses from the scan chains to identify suspected defects and isolate them to particular locations in the circuit-under-test, for example, by applying a fail model to the output of the scan chains to generate a fail log, and then analyzing the fail log to locate the suspected defects. A physical failure analysis (PFA) process can be performed to determine whether the suspected defects correspond to actual defects by physically inspecting integrated circuit chips, usually by etching away certain layers of the integrated circuit chips and then imaging the silicon surface using electronic microscopy or focused ion beams. Some of these defect diagnosis tools also can implement processes that attempt to identify physical systemic defects, often by receiving, from the PFA process, one or more known integrated circuit structures or hotspots that the defect diagnosis tools can utilize to predict defects in other portions of the circuit-under-test. While this hotspot analysis may be able to predict other hotspots of the circuit-under-test, it is often untimely, as the input hotspot comes from the PFA process performed to mitigate the defects in the circuit-under-test.

SUMMARY

This application discloses a computing system to identify suspected defects in a manufactured integrated circuit, which correspond to electrical failures detected by a test applied to the manufactured integrated circuit. The computing system can utilize the suspected defects in the manufactured integrated circuit to cluster features, such as geometric patterns, optical proximity correction (OPC) measurements, or the like, in a physical layout design describing the manufactured integrated circuit. Each cluster of the features corresponds to a candidate for a physical root cause of the suspected defects in the manufactured integrated circuit. The computing system can detect a physical root cause of the electrical failures in the manufactured integrated circuit based on the clusters of the features. A physical failure analysis process includes an inspection of the manufactured integrated circuit to confirm the physical root cause of the electrical failures in the manufactured integrated circuit corresponds to a systemic manufacturing fault in the manufactured integrated circuit. Embodiments of will be described below in greater detail.

DETAILED DESCRIPTION

Illustrative Operating Environment

Figure 1:
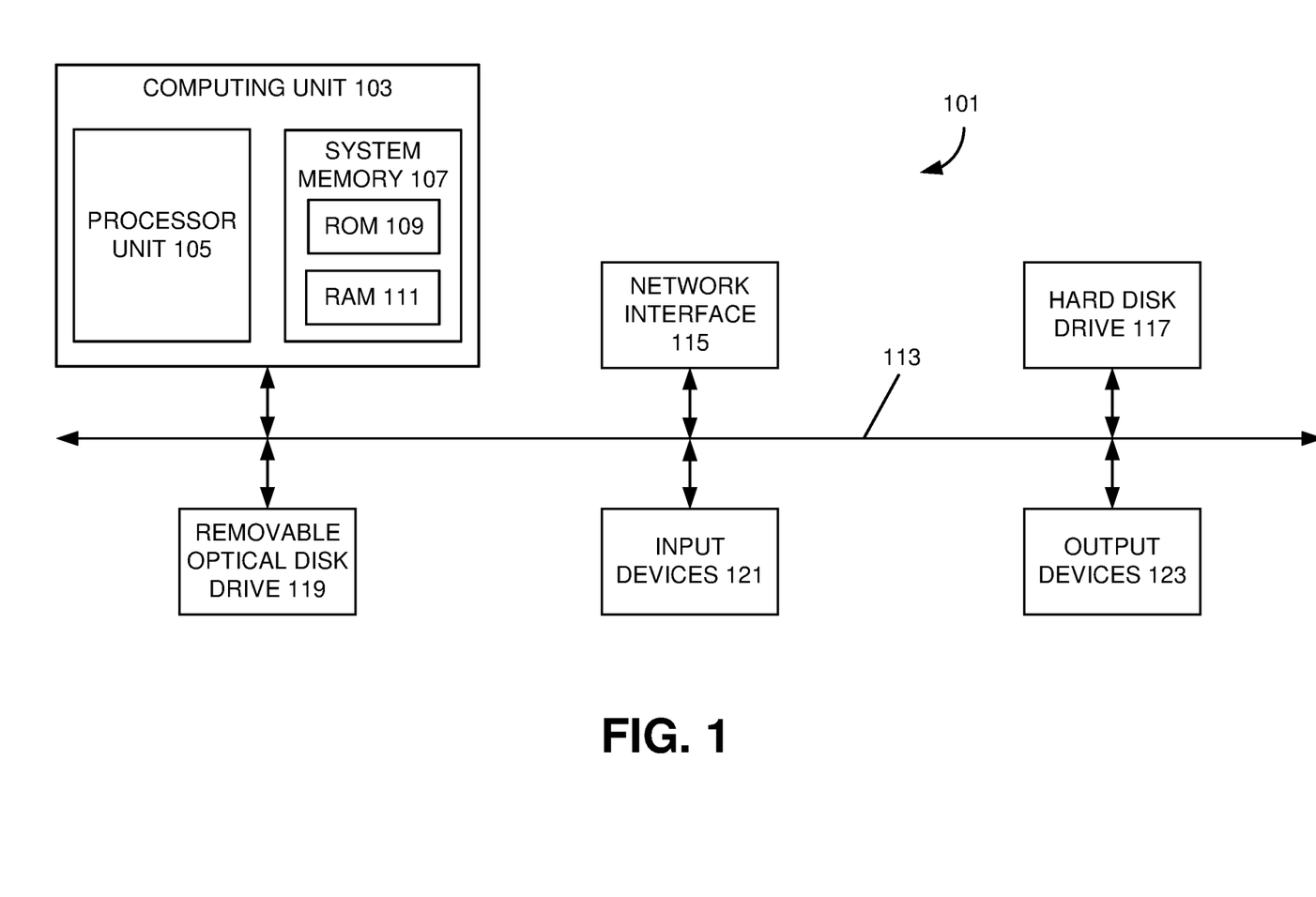
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processor unit 105 and a system memory 107. The processor unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processor unit 105.

The processor unit 105 and the system memory 107 are connected, either directly or indirectly, through a bus 113 or alternate communication structure, to one or more peripheral devices 115-123. For example, the processor unit 105 or the system memory 107 may be directly or indirectly connected to one or more additional memory storage devices, such as a hard disk drive 117, which can be magnetic and/or removable, a removable optical disk drive 119, and/or a flash memory card. The processor unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
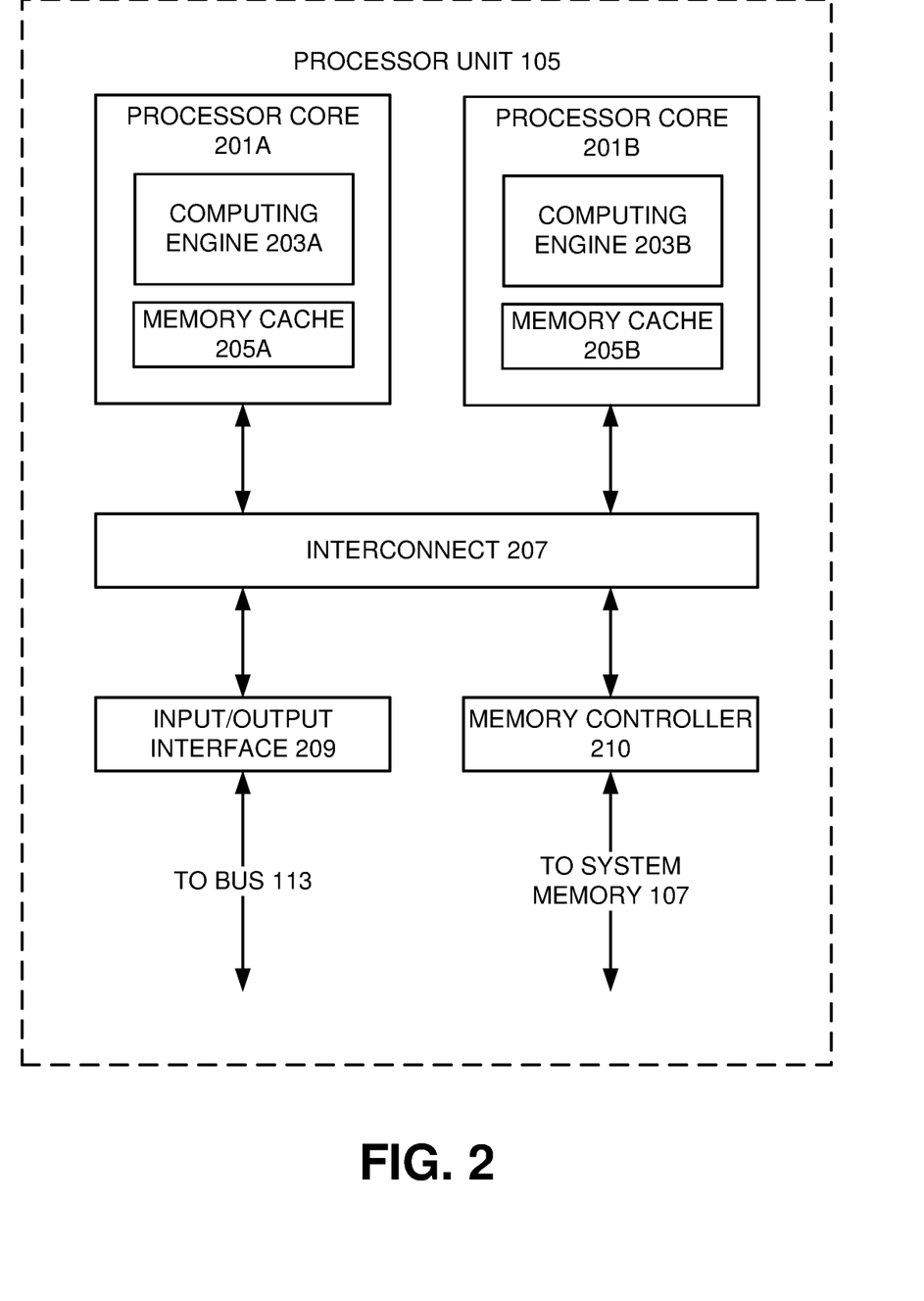

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203 and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and is not intended to suggest any limitation as to the scope of use or functionality of alternate embodiments.

Defect Diagnosis with Dynamic Root Cause Detection

Figure 3:
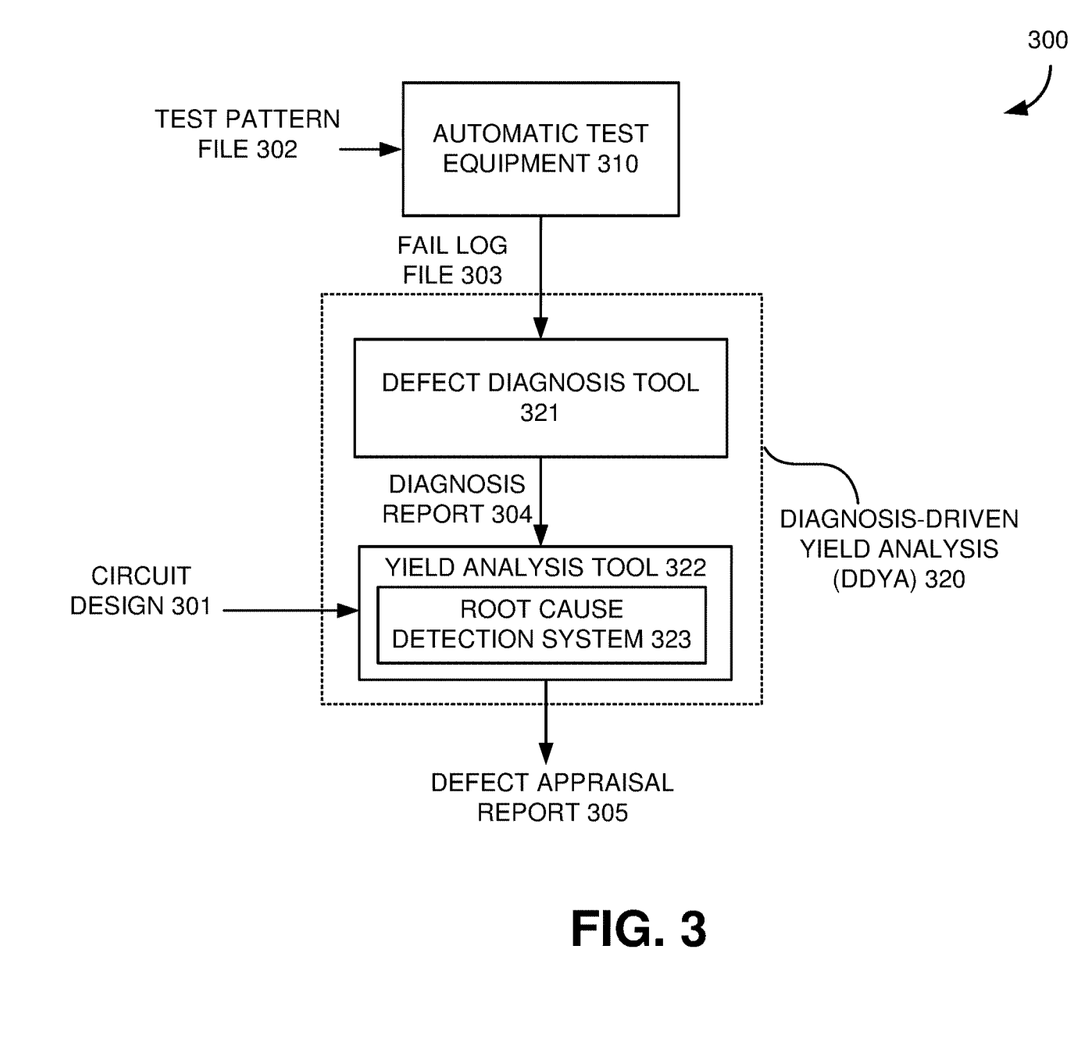
FIG. 3 illustrates an example design for test system implementing defect diagnosis with dynamic root cause detection that may be implemented according to various embodiments.

FIG. 3 illustrates an example design for test system 300 implementing defect diagnosis with dynamic root cause detection that may be implemented according to various embodiments. Referring to FIG. 3, the design for test system 300 includes Automatic Test Equipment (ATE) 310 to receive a test pattern file 302, for example, generated by an Automatic Test Pattern Generation (ATPG) tool. The test pattern file 302 can identify test patterns to be serially loaded into and unloaded from one or more scan chains in the integrated circuit described by a circuit design 301. For example, when attempting to determine a presence of a stuck-at 0 defect, an ATPG tool can generate test patterns having values of "1" shifted through the scan chain. When attempting to determine a presence of a stuck-at 1 defect, the ATPG tool can generate test patterns having values of "0" shifted through the scan chain. The circuit design 301 can describe an integrated circuit at a physical layout-level representation, which defines geometrical patterns capable of being utilized to manufacture the integrated circuit. The circuit design 301 describing the integrated circuit can be specified in a Graphic Data System II (GDSII) format, an Open Access format, a Milkyway format, an EDDM format, an Open Artwork System Interchange Standard (OASIS) format, or the like.

The ATE 310 can generate test patterns using the test pattern file 302 and apply the generated test patterns to scan chains in the manufactured integrated circuits described by the circuit design 301. The ATE 310 can unload test responses from the scan chain in the manufactured integrated circuits. The ATE 310 can generate a fail log file 303, for example, in response to the applied test patterns described in the test pattern file 302, which can include a list of test responses unloaded from the scan chains that correspond to a failure and the test patterns applied to the manufactured integrated circuits to generate the test responses.

The design for test system 300 can implement a diagnosis-driven yield analysis (DDYA) 320, for example, with a defect diagnosis tool 321 and a yield analysis tool 322, which can produce a defect appraisal report 305 from the fail log file 303. In some embodiments, the defect appraisal report 305 can identify suspected defects in the manufactured integrated circuits corresponding to a failures described in the fail log 303, along with an identification of which of the suspect defects, if any, correspond to a root cause of the failures in the fail log file 303.

The defect diagnosis tool 321 can utilize the fail log file 303 to diagnose suspected defects that could produce the failures in the fail log file 303. In some embodiments, the defect diagnosis tool 321 can determine portions of the manufactured integrated circuit corresponding to the suspected defects associated with the scan chain and generate a diagnosis report 304, which can describe the suspected defects. The diagnosis report 304 can include a listing of the symptoms of the test failure, such as a number of suspected defects, and information on the suspected defects, such as type of defects causing the failures, the possible locations of the suspected defects in the manufactured integrated circuit, a diagnostic score for the suspected defects, or the like. The diagnosis report 304, in some embodiments, can identify the possible location of the suspected defects by net, net group, cell, or the like, in the manufactured integrated circuit and/or by identifying a layer and coordinates in the manufactured integrated circuit corresponding to the suspect defect location. The diagnostic score for the suspected defects can correspond to a probability that the suspect defect corresponds to an actual defect causing the test failure in the manufactured integrated circuit.

The yield analysis tool 322 can generate the defect appraisal report 305 from the diagnosis report 304 generated by the defect diagnosis tool 321. The yield analysis tool 322 can include a root cause detection system 323 to utilize the diagnosis report 304 and the circuit design 301 to detect one or more root cause defects in the manufactured integrated circuit to include the defect appraisal report 305. The root cause defects included in the defect appraisal report 305 can identify specific features, such as geometric patterns, optical proximity correction (OPC) measurements, or the like, associated with the defects and their locations in the circuit design 301 describing the manufactured integrated circuit. Embodiments of the defect diagnosis with dynamic root cause detection will be described below with reference to FIGS. 3 and 4.

Figure 4:
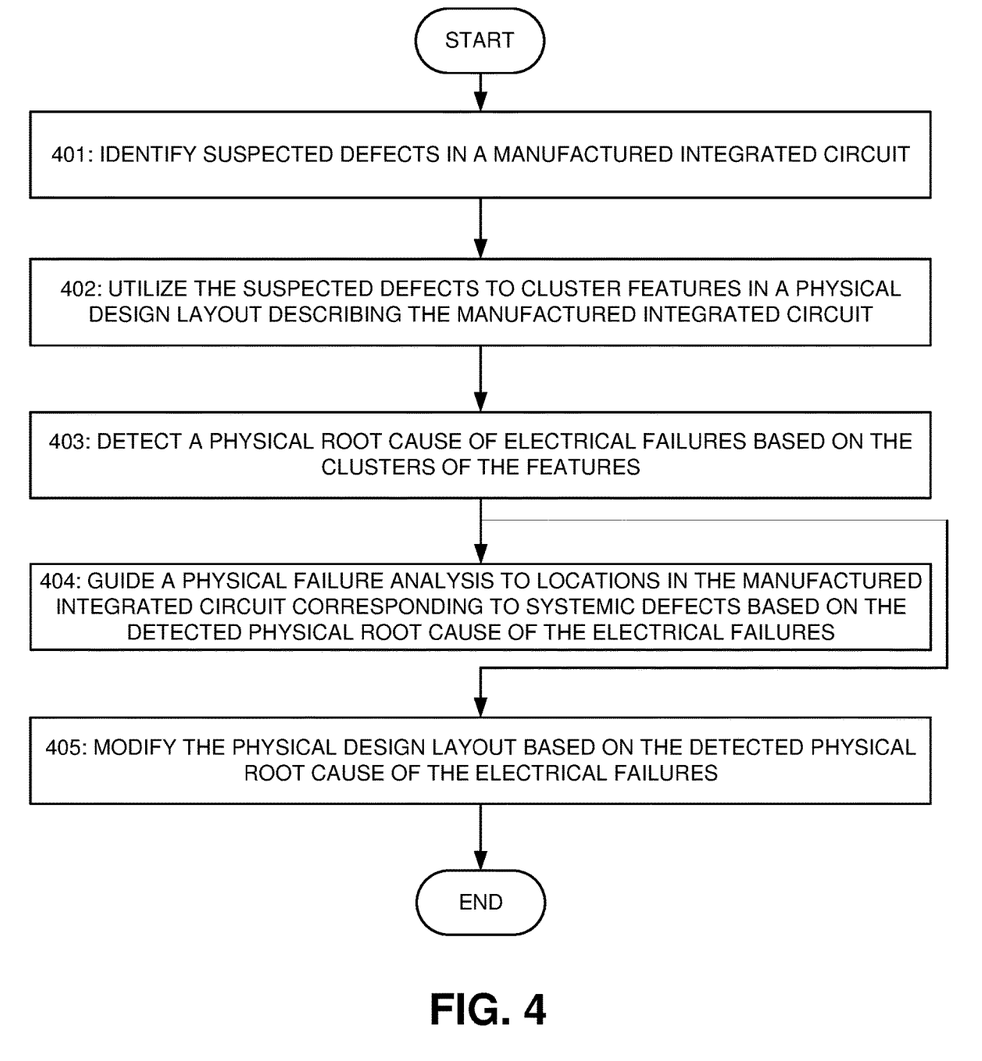
FIG. 4 illustrates a flowchart showing an example implementation of defect diagnosis with dynamic root cause detection according to various examples.

FIG. 4 illustrates a flowchart showing an example implementation of defect diagnosis with dynamic root cause detection according to various examples. Referring to FIGS. 3 and 4, the root cause detection system 323, in a block 401 of FIG. 4, can identify the suspected defects in the manufactured integrated circuit. The root cause detection system 323 can parse the diagnosis report 304 to identify information about the suspect defects, such as a types of test failure associated with the suspect defect, locations of the suspect defects, a diagnostic score for the suspect defects, or the like. In some embodiments, the root cause detection system 323 can filter the suspect defects based on the identified information about the suspects defects, for example, sorting the suspect defects and possibly removing some suspect defects based on values of the diagnostic score associated with the suspect defects. The root cause detection system 323 also can group the suspect defects based on the location of the suspect defects in the manufactured integrated circuit. For example, the root cause detection system 323 can group the suspect defects by net group and/or by pin name in the manufactured integrated circuit.

The root cause detection system 323, in a block 402 of FIG. 4, can utilize the suspected defects to cluster features in a physical design layout describing the manufactured integrated circuit. In some embodiments, the root cause detection system 323 can cluster features corresponding to points of interest (POIs) in the circuit design 301 based, at least in part, on a configuration of hyper parameters. The clustering corresponding to points of interest in the circuit design 301 by the root cause detection system 323 can divide the features corresponding to points of interest into a plurality of clusters. Each of the clusters can correspond to a candidate for a root cause defect in the manufactured integrated circuit.

The root cause detection system 323 can evaluate the clusters of the features against the suspect defects from the diagnosis report 304 to determine whether at least one of the clusters was a good fit to the suspect defects in the manufactured integrated circuit. For example, the root cause detection system 323 can correlate the clusters of features to the suspect defects based on the locations relative to the integrated circuit, such as by net group. In some embodiments, the root cause detection system 323 can perform the correlation by comparing failure probabilities of the clusters of features and the suspect defects having corresponding locations or nets of the integrated circuit.

The root cause detection system 323 can reconfigure the hyper parameter configuration, which allows the root cause detection system 323 to re-cluster the features in the circuit design 301 and correlate to the suspect defects to the new set of clusters. The root cause detection system 323 can select a set of the clusters based, at least in part, on their respective correlations to the suspect defects. The root cause detection system 323 can set the hyper parameter configuration based on the selected set of clusters generated using the hyper parameters.

In some embodiments, the root cause detection system 323 can implement an iterative feedback process to determine how to re-cluster the features in the circuit design 301. For example, the root cause detection system 323 can utilize the correlation of the feature clusters to suspect defects to reconfigure the hyper parameters for re-clustering of the features in the circuit design 301 and correlating the new set of clusters to the suspect defects from the diagnosis report 304. This iterative feedback process can allow the root cause detection system 323 to identify a set of feature clusters to select and identify which hyper parameter configuration to utilize for root cause detection. Embodiments of hyper parameter configuration for dynamic root cause detection will be described in greater detail below with reference to FIGS. 5 and 6.

The root cause detection system 323, in a block 403 of FIG. 4, can detect a physical root cause of the electrical failures based on the clusters of the features. In some embodiments, the root cause detection system 323 can implement an unsupervised machine learning algorithm with a hyper parameter configuration set based on the feature clusters. The root cause detection system 323 can identify candidates of root cause defects based on the hyper parameter configuration, and then detect if any of the candidates of root cause defects correspond to a root cause defect to include in the defect appraisal report 305.

The root cause detection system 323, in a block 404 of FIG. 4, can guide a physical failure analysis to locations in the manufactured integrated circuit corresponding to systemic defects based on the detected physical root cause of the electrical failures. The portions of the manufactured integrated circuit identified as suspected defects or root cause defects in the defect appraisal report 305 can be subsequently inspected during a physical failure analysis process to identify a presence of any manufacturing faults corresponding to the suspected defects or root cause defects. In a block 405 of FIG. 4, the circuit design 301 can be modified based on the detected physical root cause of the electrical failures, for example, to alter the geometric patterns associated with the root cause defect in the manufactured integrated circuit.

Figure 5:
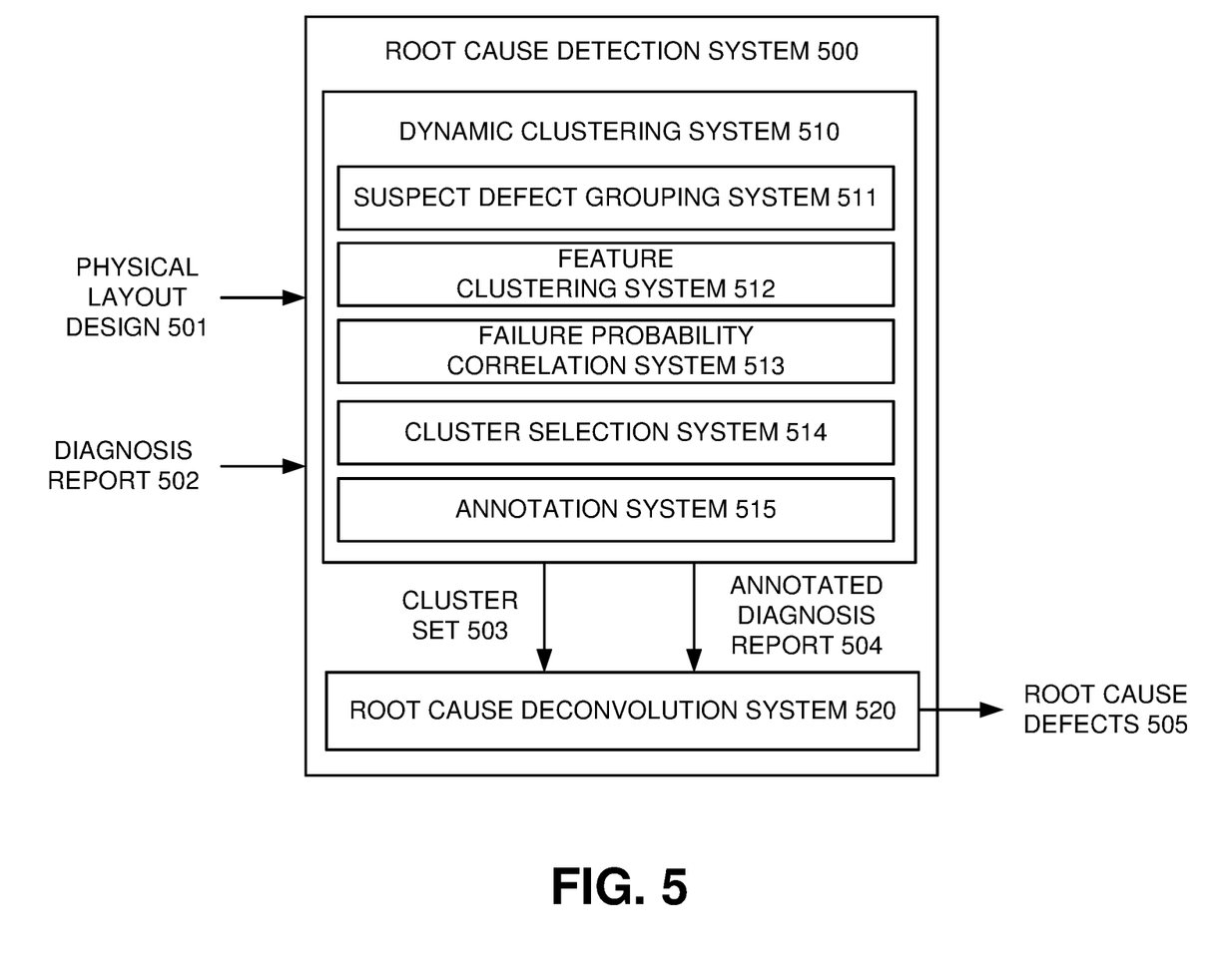
FIG. 5 illustrates an example a root cause detection system to detect root cause defects using dynamically identified design clusters, which may be implemented according to various embodiments.
Figure 6:
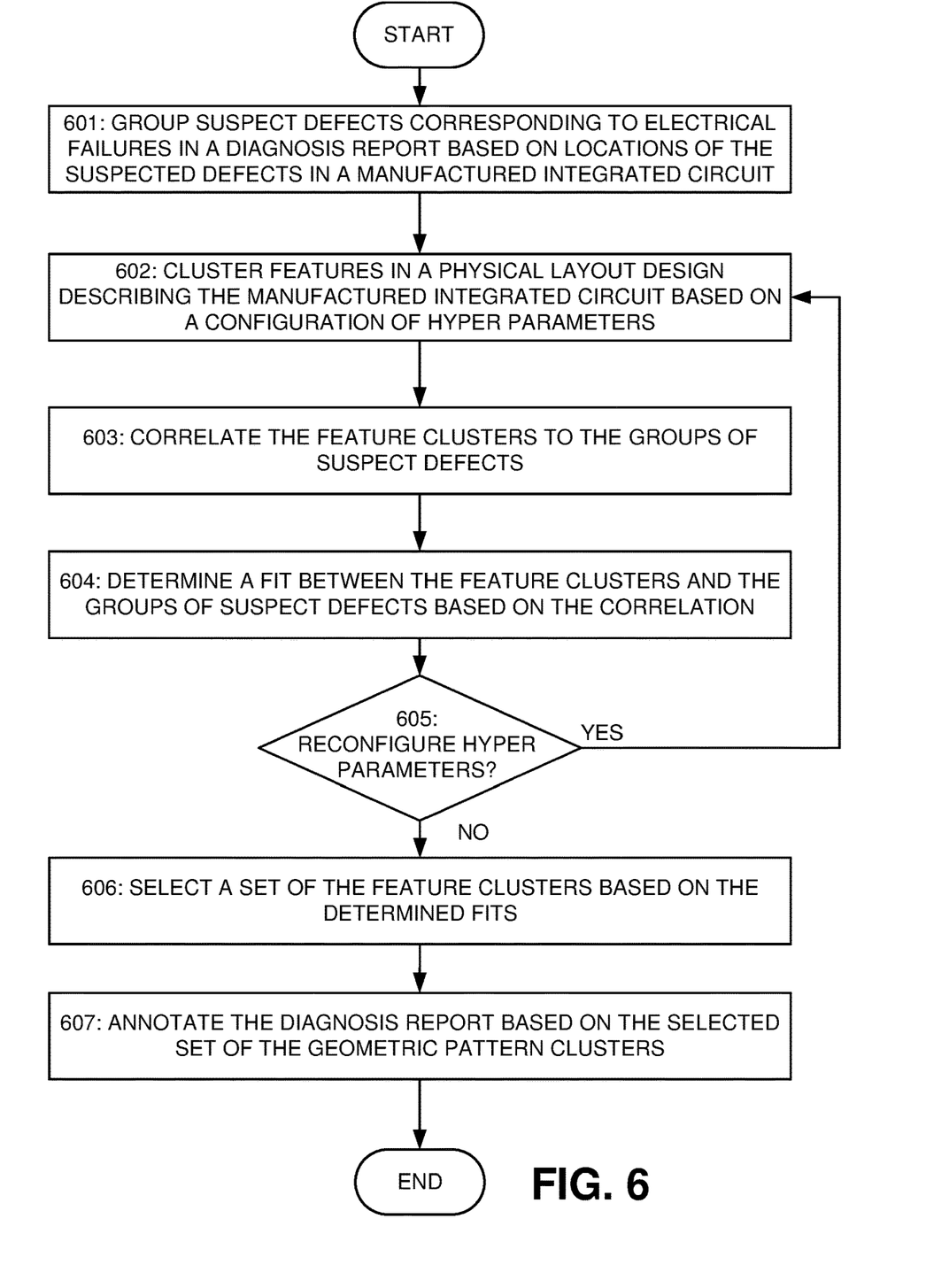
FIG. 6 illustrates a flowchart showing an example implementation of hyper parameter configuration for machine-learning based defect diagnosis with dynamic root cause detection according to various examples.

FIG. 5 illustrates an example a root cause detection system 500 to detect root cause defects using dynamically identified design clusters, which may be implemented according to various embodiments. FIG. 6 illustrates a flowchart showing an example implementation of hyper parameter configuration for machine-learning based defect diagnosis with dynamic root cause detection according to various examples. Referring to FIGS. 5 and 6, the root cause detection system 500 can receive a physical layout design 501 describing an integrated circuit at a physical layout-level representation, which defines geometrical patterns capable of being utilized to manufacture the integrated circuit. The physical layout design 501 describing the integrated circuit can be specified in a Graphic Data System II (GDSII) format, an Open Access format, a Milkyway format, an EDDM format, an Open Artwork System Interchange Standard (OASIS) format, or the like.

The root cause detection system 500 can receive a diagnosis report 502 describing suspected defects in a manufactured integrated circuit corresponding to electrical failures identified during testing post-manufacture. In some embodiments, the diagnosis report 502 can include a listing of symptoms of the test failure, such as a number of suspected defects, and information on the suspected defects, such as type of defect causing the test failure, the possible locations of the suspected defects in the manufactured integrated circuit, a diagnostic score for the suspected defects, or the like. The diagnosis report 502, in some embodiments, can identify the possible location of the suspected defects by net or cell in the manufactured integrated circuit or by identifying a layer and coordinates associated with the manufactured integrated circuit. The diagnostic score for the suspected defects can correspond to a probability that the suspect defect corresponds to an actual defect causing the test failure in the manufactured integrated circuit.

The root cause detection system 500 can include a dynamic clustering system 510 to identify candidates for the root cause defects by variously clustering features in the physical layout design 501. Each cluster of features in the physical layout design 501 can correspond to a different candidate for the root cause defect. The dynamic clustering system 510 can select one set of the feature clusters based, at least in part, on the suspect defects in the diagnosis report 502. The dynamic clustering system 510 can annotate the diagnosis report 502 to correlate the suspected defects in diagnosis report 502 with one of the clusters in the selected set of feature clusters.

The root cause detection system 500 can include a root cause deconvolution (RCD) system 520 to receive a cluster set 503 corresponding to the selected set of feature clusters and an annotated diagnosis report 504 generated by the dynamic clustering system 510. The root cause deconvolution system 520, in some embodiments, can detect root cause defects 505 in the manufactured integrated circuit using an unsupervised machine learning algorithm having hyper parameters configured based, at least in part, on the cluster set 503. The unsupervised machine learning algorithm having the configured hyper parameters can utilize the annotated diagnosis report 504 to identify one or more clusters of features in the physical layout design 501 to select as the root cause defects 505 in the manufactured integrated circuit.

The dynamic clustering system 510 can include a suspect defect grouping system 511 that, in a block 601 of FIG. 6, can group suspect defects corresponding to electrical failures in a diagnosis report 502 based on locations of the suspect defects in a manufactured integrated circuit. The suspect defect grouping system 511 can identify the suspected defects in the manufactured integrated circuit by parsing the diagnosis report 502 to identify information about the suspect defects, such as a types of test failure associated with the suspect defect, locations of the suspect defects, a diagnostic score for the suspect defects, or the like. In some embodiments, the suspect defect grouping system 511 can filter the suspect defects based on the identified information about the suspects defects, for example, sorting the suspect defects and possibly removing some suspect defects based on values of the diagnostic score associated with the suspect defects. The suspect defect grouping system 511 can group the suspect defects by net group and/or by pin name in the manufactured integrated circuit.

The dynamic clustering system 510 can include a feature clustering system 512 that, in a block 602 of FIG. 6, can cluster features in the physical layout design 501. In some embodiments, the feature clustering system 512 can cluster features corresponding to points of interest in the physical layout design 501 based, at least in part, on a configuration of hyper parameters for an unsupervised machine-learning algorithm implemented in a computing system. Each of the clusters can correspond to a candidate for a root cause defect in the manufactured integrated circuit.

The dynamic clustering system 510 can include a failure probability correlation system 513 that, in a block 603 of FIG. 6, can correlate the feature clusters to the groups of suspect defects. The failure probability correlation system 513 can merge the feature clusters to the groups of suspect defects based on their respective locations of the manufactured integrated circuit, for example, based on nets, net group and/or pin name. In some embodiments, the failure probability correlation system 513 can build a matrix including counts of feature clusters corresponding to cross-sections of each net group identifier and cluster identifier. The failure probability correlation system 513 can utilize the merged feature clusters and groups of suspect defects to compare failure probabilities for feature clusters and the groups of the suspect defects. In some embodiments, the failure probability for the group of suspect defects can be determined based on Equation:

$$\frac{f_i^k}{\sum_{k=1}^{N} f_i^k} = p_i \qquad \text{Equation 1}$$

In Equation 1, the failure probability p for a net i and a fail mode k can be based on a number of suspect defects f. In some embodiments, the failure probability for the feature clusters can be determined based on Equation 2:

$$p_i = \frac{1 - e^{-R^k N_i^k}}{\sum_{k=1}^{N} \left(1 - e^{-R^k N_i^k}\right)} \qquad \text{Equation 2}$$

In Equation 2, the failure probability p for a net i and a fail mode k can be based on a fail rate R and a number of points of interest within a cluster N. The failure probability correlation system 513, for each net and fail mode, can compare failure probabilities from the feature clusters against the failure probabilities from the suspect defects. The failure probability correlation system 513, in a block 604 of FIG. 6, can determine a fit between the feature clusters and the groups of suspect defects based on the correlation. In some embodiments, the failure probability correlation system 513 can determine a root mean squared error (RMSE) for each feature cluster based on the comparison of the failure probabilities. The failure probability correlation system 513 also can determine a symptom coverage for each of the feature clusters, which can correspond to percentages of the suspect defects potentially explained by the features within each of the feature clusters.

The failure probability correlation system 513 can select one of the feature clusters based on the fit of the feature clusters to the groups of suspect defects. The selected feature cluster can be the cluster having a relatively low root mean squared error, a relatively high symptom coverage, and a relatively small number of POIs in the feature cluster compared to the other feature clusters. In some embodiments, the failure probability correlation system 513 can include a cost function that can be utilized to determine the fit and selection of the feature cluster.

The dynamic clustering system 510, in a decision block 605 of FIG. 6, can determine whether to reconfigure the hyper parameters. In some embodiments, the decision whether to reconfigure the hyper parameters can be based on the determined fit of the selected feature cluster determined in the block 604 or based on a number of configurations previously utilized by the dynamic clustering system 510.

When the dynamic clustering system 510 determined to reconfigure the hyper parameters, execution can return to the block 602, where the feature clustering system 512 can cluster the features in the physical layout design 501 using hyper parameters with the new configuration before correlating the new set of feature clusters to determine their fit and selecting one of the clusters in the new set based on the fit.

When the dynamic clustering system 510 determined to not reconfigure the hyper parameters, execution can proceed to a block 606 of FIG. 6, where the dynamic clustering system 510 can include a cluster selection system 514 to select a set of the feature clusters based on the determined fits. In some embodiments, the cluster selection system 514 can analyze each of the feature clusters selected in the block 604 based on fit to select one of those selected feature clusters. The selected feature cluster can be the cluster having a relatively low root mean squared error, a relatively high symptom coverage, and a relatively small number of POIs in the feature cluster compared to the other previously selected feature clusters. The cluster selection system 514 can identify the hyper parameters utilized to generate the selected feature cluster and select the set of clusters including the selected feature cluster for use in a subsequent root cause defect detection process by the root cause deconvolution system 520.

The dynamic clustering system 510 can include an annotation system 515 that, in a block 607 of FIG. 6, can annotate the diagnosis report 502 based on the selected set of the feature clusters. In some embodiments, the annotation system 515 can add identifiers to the diagnosis report 502 for the suspect defects, which can correlate each of the suspect defects to one of the feature clusters in the selected set of the feature clusters.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to design processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
identifying, by a computing system, suspected defects in a manufactured integrated circuit, which correspond to electrical failures detected by a test applied to the manufactured integrated circuit;
utilizing, by the computing system, the suspected defects in the manufactured integrated circuit to iteratively cluster features in a physical layout design describing the manufactured integrated circuit into multiple different sets of clusters;
separately correlating, by the computing system, each of the sets of the clusters of features in the physical layout design with the suspected defects in the manufactured integrated circuit;
selecting, by the computing system, one of the sets of the clusters of features based, at least in part, on the correlation of the sets of the clusters to the suspected defects; and
detecting, by the computing system, at least one physical root cause of the electrical failures in the manufactured integrated circuit based, at least in part, on the selected set of clusters of features.

2. The method of claim 1, wherein the manufactured integrated circuit is inspected during a physical failure analysis process to confirm the physical root cause of the electrical failures in the manufactured integrated circuit corresponds to a systemic manufacturing fault in the manufactured integrated circuit.

3. The method of claim 1, wherein each cluster of the features corresponds to a candidate for the physical root cause of the suspected defects in the manufactured integrated circuit, and wherein detecting the at least one physical root cause includes selecting at least one of the candidates as the physical root cause of the electrical failures in the manufactured integrated circuit.

4. The method of claim 1, wherein the iterative clustering of the features in the physical layout design is based, at least in part, on prior correlations of at least one set of clusters of features to the suspect defects.

5. The method of claim 1, wherein separately correlating each of the sets of the clusters of features in the physical layout design with the suspected defects in the manufactured integrated circuit further comprises separately correlating the probabilities of failure for the sets of the clusters of features to the probabilities of failure for groups of the suspected defects.

6. The method of claim 1, wherein selecting one of the sets of the clusters of features for use in the detection of the physical root cause of the electrical failures in the manufactured integrated circuit further comprises setting hyper parameters for an unsupervised machine learning algorithm, and wherein detecting the at least one physical root cause of the electrical failures in the manufactured integrated circuit is performed by the unsupervised machine learning algorithm using the hyper parameters.

7. A system comprising:
a memory system configured to store computer-executable instructions; and
a computing system, in response to execution of the computer-executable instructions, is configured to:
identify suspected defects in a manufactured integrated circuit, which correspond to electrical failures detected by a test applied to the manufactured integrated circuit;
utilize the suspected defects in the manufactured integrated circuit to iteratively cluster features in a physical layout design describing the manufactured integrated circuit into multiple different sets of clusters;
separately correlate each of the sets of the clusters of features in the physical layout design with the suspected defects in the manufactured integrated circuit;
select one of the sets of the clusters of features based, at least in part, on the correlation of the sets of the clusters to the suspected defects; and
detect at least one physical root cause of the electrical failures in the manufactured integrated circuit based, at least in part, on the selected set of clusters of the features.

8. The system of claim 7, wherein the manufactured integrated circuit is inspected during a physical failure analysis process to confirm the physical root cause of the electrical failures in the manufactured integrated circuit corresponds to a systemic manufacturing fault in the manufactured integrated circuit.

9. The system of claim 7, wherein each cluster of the features corresponds to a candidate for the physical root cause of the suspected defects in the manufactured integrated circuit, and wherein the computing system, in response to execution of the computer-executable instructions, is further configured to detect the at least one physical root cause by selecting at least one of the candidates as the physical root cause of the electrical failures in the manufactured integrated circuit.

10. The system of claim 7, wherein the iterative clustering of the features in the physical layout design is based, at least in part, on prior correlations of at least one set of clusters of features to the suspect defects.

11. The system of claim 7, wherein selecting one of the sets of the clusters of features for use in the detection of the physical root cause of the electrical failures in the manufactured integrated circuit further comprises setting hyper parameters for an unsupervised machine learning algorithm, and wherein detecting the at least one physical root cause of the electrical failures in the manufactured integrated circuit is performed by the unsupervised machine learning algorithm using the hyper parameters.

12. An apparatus comprising at least one computer-readable memory device storing instructions configured to cause one or more processing devices to perform operations comprising:
identifying suspected defects in a manufactured integrated circuit, which correspond to electrical failures detected by a test applied to the manufactured integrated circuit;
utilizing the suspected defects in the manufactured integrated circuit to iteratively cluster features in a physical layout design describing the manufactured integrated circuit into multiple different sets of clusters;
separately correlating each of the sets of the clusters of features in the physical layout design with the suspected defects in the manufactured integrated circuit;

selecting one of the sets of the clusters of features based, at least in part, on the correlation of the sets of the clusters to the suspected defects; and detecting at least one physical root cause of the electrical failures in the manufactured integrated circuit based, at least in part, on the selected set of clusters of the features.

13. The apparatus of claim 12, wherein the manufactured integrated circuit is inspected during a physical failure analysis process to confirm the physical root cause of the electrical failures in the manufactured integrated circuit corresponds to a systemic manufacturing fault in the manufactured integrated circuit.

14. The apparatus of claim 12, wherein each cluster of the features corresponds to a candidate for the physical root cause of the suspected defects in the manufactured integrated circuit, and wherein detecting the at least one physical root cause includes selecting at least one of the candidates as the physical root cause of the electrical failures in the manufactured integrated circuit.

15. The apparatus of claim 12, wherein the iterative clustering of the features in the physical layout design is based, at least in part, on prior correlations of at least one set of clusters of features to the suspect defects.

16. The apparatus of claim 12, wherein separately correlating each of the sets of the clusters of features in the physical layout design with the suspected defects in the manufactured integrated circuit further comprises separately correlating the probabilities of failure for the sets of the clusters of features to the probabilities of failure for groups of the suspected defects.

17. The apparatus of claim 12, wherein selecting one of the sets of the clusters of features for use in the detection of the physical root cause of the electrical failures in the manufactured integrated circuit further comprises setting hyper parameters for an unsupervised machine learning algorithm, and wherein detecting the at least one physical root cause of the electrical failures in the manufactured integrated circuit is performed by the unsupervised machine learning algorithm using the hyper parameters.

* * * * *